United States Patent
Dennis

(10) Patent No.: US 9,406,310 B2
(45) Date of Patent: Aug. 2, 2016

(54) VEHICLE VOICE INTERFACE SYSTEM CALIBRATION METHOD

(75) Inventor: Patrick Dennis, Northville, MI (US)

(73) Assignee: NISSAN NORTH AMERICA, INC., Franklin, TN (US)

(*) Notice: Subject to any disclaimer, the term of this patent is extended or adjusted under 35 U.S.C. 154(b) by 1246 days.

(21) Appl. No.: 13/345,531

(22) Filed: Jan. 6, 2012

(65) Prior Publication Data

US 2013/0179164 A1   Jul. 11, 2013

(51) Int. Cl.
| | |
|---|---|
| *G10L 21/02* | (2013.01) |
| *G10L 21/0216* | (2013.01) |
| *G01C 21/36* | (2006.01) |
| *G10L 21/0316* | (2013.01) |
| *G10L 21/0264* | (2013.01) |
| *G10L 15/22* | (2006.01) |
| *G10L 21/0208* | (2013.01) |

(52) U.S. Cl.
CPC ........ *G10L 21/0216* (2013.01); *G01C 21/3608* (2013.01); *G10L 15/22* (2013.01); *G10L 21/0264* (2013.01); *G10L 21/0316* (2013.01); *G10L 2021/02082* (2013.01)

(58) Field of Classification Search
CPC ..... G10L 15/20; G10L 21/0208; G10L 15/01; G10L 17/26; G10L 2021/02082; G10L 2021/03646; G10L 21/02; G10L 21/0316; G10L 25/48; B60R 11/0247; B60R 2011/0294; H04M 1/6075; H04R 3/005

USPC ............... 704/234, 245; 381/57, 59
See application file for complete search history.

(56) References Cited

U.S. PATENT DOCUMENTS

| | | |
|---|---|---|
| 6,418,411 B1 | 7/2002 | Gong |
| 7,676,363 B2 | 3/2010 | Chengalvarayan et al. |

(Continued)

OTHER PUBLICATIONS

Satoshi Nakamura et al., Noise and Room Acoustics Distorted Speech Recognition by HMM Composition, 1996, p. 69-72, Nara, Japan.

*Primary Examiner* — Douglas Godbold
*Assistant Examiner* — Mark Villena
(74) *Attorney, Agent, or Firm* — Global IP Counselors, LLP

(57) ABSTRACT

A vehicle voice interface system calibration method comprising electronically convolving voice command data with voice impulse response data, electronically convolving audio system output data with feedback impulse response data, and calibrating the vehicle voice interface system. The voice command data is electronically convolved with voice impulse response data representing a voice acoustic signal path between an artificial mouth simulator and a first microphone, to simulate a voice acoustic transfer function pertaining to the passenger compartment. The audio system output data is convolved with feedback impulse response data representing a feedback acoustic signal path between a vehicle audio system output and a second microphone, to simulate a feedback acoustic transfer function pertaining to the passenger compartment. The voice interface system is calibrated to recognize voice commands represented by the voice command data based on the simulated voice and feedback acoustic transfer functions.

15 Claims, 3 Drawing Sheets

(56) References Cited

U.S. PATENT DOCUMENTS

| | | | |
|---|---|---|---|
| 7,729,911 B2 | 6/2010 | Chengalvarayan et al. | |
| 8,949,120 B1* | 2/2015 | Every et al. | G10L 21/0208 381/71.1 |
| 2001/0037195 A1* | 11/2001 | Acero | G10L 25/78 704/200 |
| 2003/0236672 A1* | 12/2003 | Aaron et al. | 704/277 |
| 2004/0234080 A1* | 11/2004 | Hernandez | G10K 11/178 381/71.11 |
| 2006/0009971 A1* | 1/2006 | Kushner | G10L 17/26 704/231 |
| 2007/0073539 A1* | 3/2007 | Chengalvarayan et al. | 704/245 |
| 2007/0207840 A1* | 9/2007 | Kurauchi et al. | 455/569.2 |
| 2008/0004875 A1* | 1/2008 | Chengalvarayan et al. | 704/234 |
| 2008/0212788 A1* | 9/2008 | Bech | H04S 7/00 381/59 |
| 2009/0012794 A1* | 1/2009 | van Wijngaarden | G10L 25/48 704/270 |
| 2009/0022330 A1* | 1/2009 | Haulick et al. | 381/57 |
| 2009/0154725 A1* | 6/2009 | Paik | H04S 3/002 381/86 |
| 2010/0208904 A1* | 8/2010 | Nakajima | H04R 1/406 381/58 |
| 2010/0215184 A1* | 8/2010 | Buck | H04M 9/082 381/66 |
| 2011/0064232 A1* | 3/2011 | Ruwisch | 381/59 |
| 2011/0261977 A1* | 10/2011 | Hiroe | G10L 21/0272 381/119 |
| 2012/0008806 A1* | 1/2012 | Hess | H04R 1/023 381/302 |

* cited by examiner

VEHICLE VOICE INTERFACE SYSTEM CALIBRATION METHOD

BACKGROUND OF THE INVENTION

1. Field of the Invention

The present invention relates to a vehicle voice interface system calibration method. More specifically, the present invention relates to a vehicle voice interface system calibration method that simulates voice and feedback responses to perform the calibration in a bench test environment.

2. Background Information

Many vehicles include a voice interface device such as a voice recognition device that enables a vehicle occupant to control components of the vehicle, such as the communication and entertainment systems, by voice commands, or a mobile hands-free interface device for communication through a mobile device. When a voice interface device is to be employed in a particular make and model of vehicle, the voice interface device is subjected to a calibration process. Conventionally, the calibration process is performed over a period of five days using a head and torso simulator, an audio pre-amplifier, a laptop and the vehicle under test. The vehicle is run for approximately 40 hours (e.g., 8 hours per day) while a technician monitors the results. Therefore, a testing facility sufficient to accommodate a running vehicle is needed for the calibration process, while 40 hours worth of fuel is consumed during the process and 40 hours of technician time is expended for the process.

SUMMARY

It has been discovered that a more efficient process for calibrating a vehicle voice interface system is desirable.

Accordingly, in view of the state of the known technology, one aspect of the present invention is directed to a vehicle voice interface system calibration method comprising electronically convolving voice command data with voice impulse response data, electronically convolving audio system output data with feedback impulse response data, and calibrating the vehicle voice interface system. The electronically convolving convolves the voice command data with the voice impulse response data representing a voice acoustic signal path between an artificial mouth simulator present in a passenger compartment of a vehicle and a first microphone present in the passenger compartment, to simulate a voice acoustic transfer function pertaining to the passenger compartment of the vehicle. The electronically convolving convolves the audio system output data with the feedback impulse response data representing a feedback acoustic signal path between a vehicle audio system output and a second microphone present in the passenger compartment, to simulate a feedback acoustic transfer function pertaining to the passenger compartment of the vehicle. The calibrating calibrates the vehicle voice interface system to recognize voice commands represented by the voice command data based on the simulated voice acoustic transfer function and the simulated feedback acoustic transfer function.

BRIEF DESCRIPTION OF THE DRAWINGS

Referring now to the attached drawings which form a part of this original disclosure.

DETAILED DESCRIPTION OF EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
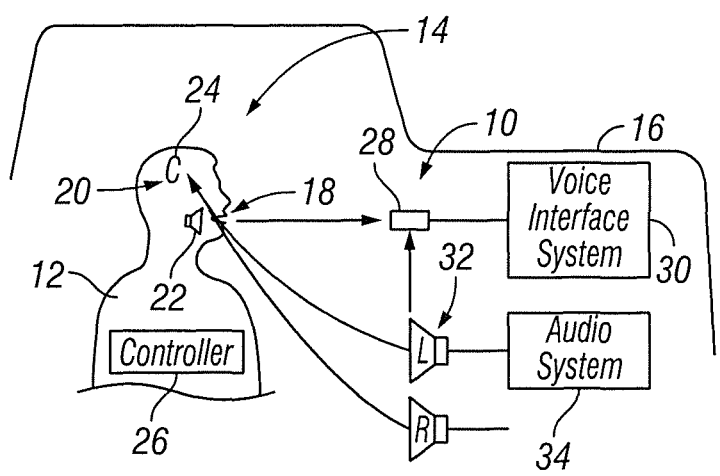
FIG. 1 is a block diagram illustrating an example of a head and torso simulator and a vehicle voice interface system used by a vehicle voice interface system calibration device and method according to disclosed embodiments.
Figure 2:
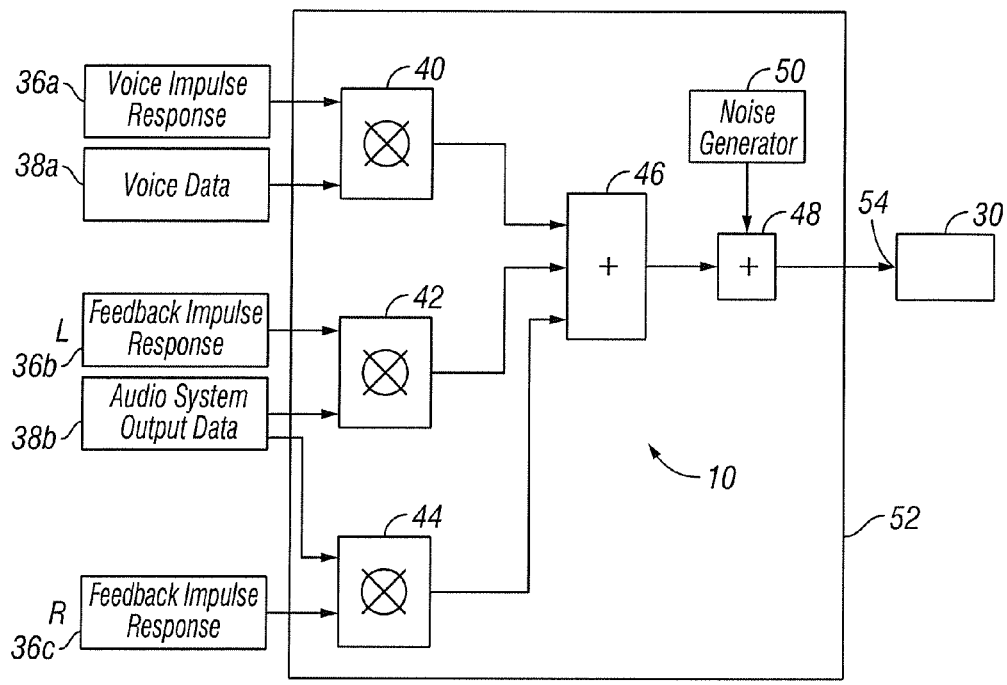
FIG. 2 is a block diagram illustrating an example of convolution components, combiners and a noise generator used by the vehicle voice interface system calibration device and method according to the disclosed embodiments.

FIGS. 1 and 2 illustrate components of a vehicle voice interface system calibration device 10 according to a disclosed embodiment. As shown in FIG. 1, the calibration device 10 includes a head and torso simulator 12 that can be positioned within the passenger compartment 14 of a vehicle 16. As understood in the art, a head and torso simulator 12 includes an artificial mouth simulator 18 and an artificial ear simulator 20. The artificial mouth simulator 18 includes, for example, a speaker 22 that can be controlled to emit sounds, including those within the audible range. The artificial ear simulator 20 includes, for example, a microphone 24 that can be controlled to receive sounds, including those within the audible range.

The head and torso simulator 12 can further include a controller 26. The controller 26 can operate to control the speaker 22 to emit the sounds, and to process the sounds received by the microphone 24 as discussed herein. As understood by one skilled in the art, the controller 26 preferably includes a microcomputer with a control program that controls the components of the head and torso simulator 12 as discussed herein. The controller 26 can also include other conventional components such as an input interface circuit, an output interface circuit, and storage devices such as a ROM (Read Only Memory) device and a RAM (Random Access Memory) device. The RAM and ROM store processing results and control programs that are run by the controller 26. The controller 26 is operatively coupled to the components of the head and torso simulator 12, and to the components of the vehicle voice interface system calibration device 10 as appropriate, in a conventional manner. It will be apparent to those skilled in the art from this disclosure that the precise structure and algorithms for the controller 26 can be any combination of hardware and software that will carry out the functions of the present invention. Furthermore, the controller 26 can be remote from the head and torso simulator 12. In such an arrangement, the controller 26 communicates with the components of the head and torso simulator 12, such as the speaker 22 and the microphone 24, via wired or wireless connections as understood in the art.

The head and torso simulator 12 is employed to obtain baseline data. The baseline data includes voice impulse response data and feedback impulse response data that are used by the calibration device 10 as discussed below. In this example, the voice impulse response data represents the acoustic signal path between the speaker 22 of the mouth simulator 18 and a microphone 28. The microphone 28 can be a microphone input to a vehicle voice interface system 30 as discussed in more detail below. The vehicle voice interface system 30 can be, for example, a voice recognition device or a mobile hands-free interface device, such as a Bluetooth device, or any other suitable type of device as understood in the art. Also in this example, the feedback impulse response data represents the acoustic signal path between the audio output, such as a speaker arrangement 32, of the vehicle audio system 34 and either the microphone 24 of the artificial ear simulator 20 or the microphone 28. Naturally, the vehicle voice interface system 30 and the vehicle audio system 34 can each include a controller having components similar to controller 26 as discussed above.

Figure 3:
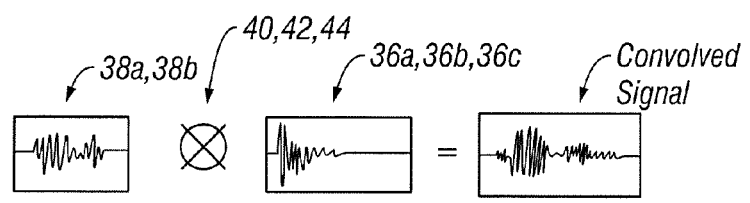
FIG. 3 is a graph illustrating an example of a convolution operation performed by the convolution components shown in FIG. 2.

As shown in FIG. 2, the calibration device 10 further includes a first convolution component 40, a second convolution component 42 and a third convolution component 44. As discussed in more detail below, the first convolution component 40 receives the voice impulse response data 36a and voice data 38a, and convolves the voice impulse response data 36a with the voice data 38a. The second convolution component 42 receives a left feedback impulse response data 36b and audio system output data 38b, and convolves the left feedback impulse response data 36b with the audio system output data 38b. The third convolution component 44 receives a right feedback impulse response data 36c and the audio system output data 38b, and convolves the right feedback impulse response data 36c with the audio system output data 38b. The convolution components 40, 42 and 44 can receive the voice impulse response data 36a, the voice data 38a, the left feedback impulse response data 36b, the right feedback impulse response data 36c, and the audio system output data 38b via wired or wireless connections as understood in the art. The convolution components 40, 42 and 44 can each be individual components, or they can integrated in any combination in a single component. FIG. 3 illustrates an example of the manner in which the data can be convolved with an impulse response to produce a convolved signal as understood in the art.

As further shown in FIG. 2, the outputs of the first, second and third convolution components 40, 42 and 44 are combined, for example, added, in a first combiner 46. The output of the first combiner 46 can then be combined with, for example, added, to a noise signal in a second combiner 48. The noise signal can include, for example, idling and climate control noise associated with the vehicle 16, and can be provided by a noise generator 50 as understood in the art. The combined electrical signal output by the second combiner 48 is thus provided to the vehicle voice interface system 30 to calibrate the vehicle voice interface system 30 as discussed herein.

Any or all of the first, second and third convolution components 40, 42 and 44 can be included in a computer 52 that is operated to perform the electronically convolving of the voice command data 38a with the voice impulse response data 36a and the electronically convolving of audio system output data 38b with the feedback impulse response data 36b and 36c. Also, either or both of the first and second combiners 46 and 48 can be included in the computer 52 or in another computer (not shown). The noise generator 50 can also be included in the computer 52 or can be a separate noise generating device. Thus, the second combiner 48 can be configured as a noise mixing device outside of the computer 52, and can be operated to combine the electrical signal provided from combiner 46 and a noise electrical signal representing noise associated with the vehicle 16 into the combined electrical signal.

As understood by one skilled in the art, the computer 52 preferably includes a microcomputer with a control program that controls the components of the vehicle voice interface system calibration device 10 as discussed herein. The computer 52 can also include other conventional components such as an input interface circuit, an output interface circuit, and storage devices such as a ROM (Read Only Memory) device and a RAM (Random Access Memory) device. The RAM and ROM store processing results and control programs that are run by the computer 52. The computer 52 is operatively coupled to the components of the vehicle voice interface system calibration device 10 as appropriate, in a conventional manner. It will be apparent to those skilled in the art from this disclosure that the precise structure and algorithms for the computer 52 can be any combination of hardware and software that will carry out the functions of the present invention.

Figure 4:
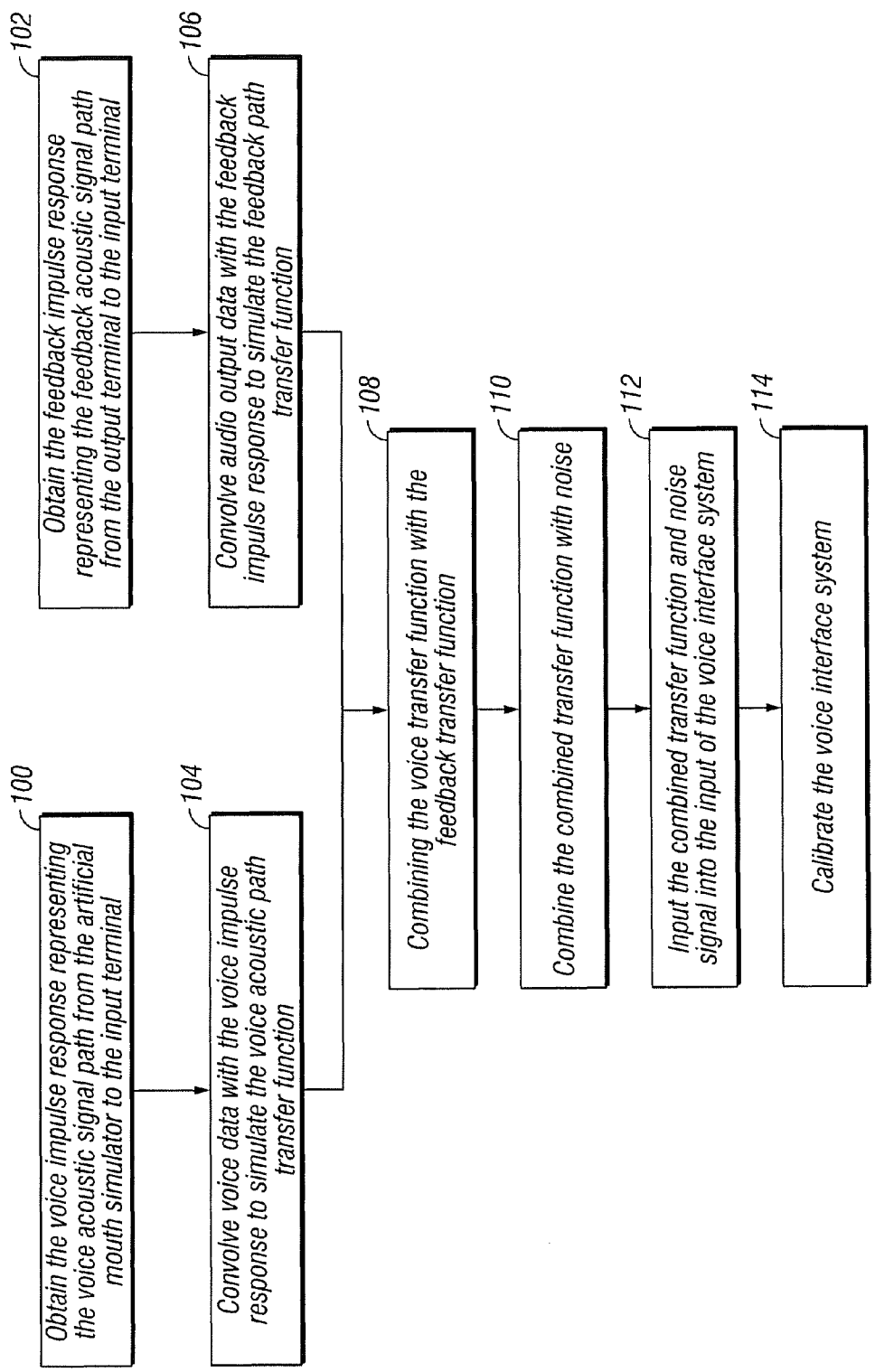
FIG. 4 is a flowchart illustrating an example of operations performed by the vehicle voice interface system calibration device and method.

An example of operations performed by the calibration device 10 according to a disclosed embodiment will now be described with reference to the flowchart of FIG. 4. Once the head and torso simulator 12 has been positioned within the passenger compartment of the vehicle 16, the speaker 22 of the artificial mouth simulator 18 is operated to output a first reference audio signal. The first reference audio signal is received by a first microphone, such as microphone 28 of the vehicle voice interface system 30. Therefore, in step 100, the vehicle voice interface system 30 can capture the voice impulse response data representing the acoustic signal path between the mouth simulator 18 and the first microphone 28.

The vehicle audio system 10 can then be operated to output a second reference audio signal via a vehicle audio system output, such as the speaker arrangement 32. The speaker arrangement 32 can include one or more speakers, such as a left speaker L and a right speaker R. This second reference audio signal can be received by a second microphone, such as the microphone 24 in the artificial ear simulator 20. Accordingly, in step 102, the head and torso simulator 12 can capture the feedback impulse response data representing the acoustic signal path between the vehicle audio system output and the microphone 24. In an arrangement where the vehicle audio system output includes a left speaker L and a right speaker R, the head and torso simulator 12 captures first feedback impulse response data representing a feedback acoustic signal path between the left speaker L and the second microphone 24. The head and torso simulator 12 also captures second feedback impulse response data representing a feedback acoustic signal path between the right speaker R and the second microphone 24. Accordingly, the feedback impulse response data includes the first and second feedback impulse response data.

Also, instead of the second microphone being the microphone 24 in the head and torso simulator 12, the second microphone can be another microphone, such as the microphone 28 or an additional microphone that provides a microphone input to the vehicle voice interface system 30. In this arrangement, the vehicle voice interface system 30 can capture the voice impulse response data representing the voice acoustic signal path between the speaker 22 of the artificial mouth simulator 18 present in the passenger compartment 14 of the vehicle 16 and the microphone input of the vehicle voice interface system 30. Likewise, the vehicle voice interface system 30 can capture the feedback impulse response data representing the feedback acoustic signal path between the vehicle audio system output and the microphone input of the vehicle voice interface system 30. In the arrangement having left and right speakers L and R, the vehicle voice interface system 30 can thus capture the first and second feedback impulse response data as discussed above.

As can be appreciated by one skilled in the art, all of the information used for the calibration process is included in the voice impulse response data and the feedback impulse response data. Typically, the process of obtaining and confirming the voice impulse response data and the feedback impulse response data can take about 4 hours. Once the voice impulse response data and the feedback impulse response data have been obtained, the head and torso simulator 12 and the vehicle 16 are no longer needed to test and calibrate the vehicle voice interface system 30. Accordingly, the calibration device 10 as discussed below can be used in a bench test environment to test and calibrate the vehicle voice interface system 30.

As will now be discussed, the first, second and third convolution components 40, 42 and 44 of the calibration device 10 convolve the data. That is, as shown in FIG. 2, the first convolution component 40 of the calibration device 10 electronically convolves the voice command data 38a with the voice impulse response data 36a in step 104 to simulate a voice acoustic transfer function pertaining to the passenger compartment 14 of the vehicle 16. The second and third convolution components 42 and 44 electronically convolve the audio system output data 38b with the feedback impulse response data 36b and 36c in step 106 to simulate a feedback acoustic transfer function pertaining to the passenger compartment 14 of the vehicle 16. For example, the second convolution component 42 convolves the audio system output data 38b with the first feedback impulse response data 36b representing a feedback acoustic signal path between the left speaker L and the second microphone 24. Similarly, the third convolution component 44 convolves the audio system output data 38b with the second feedback impulse response data 36c representing a feedback acoustic signal path between the right speaker R and the second microphone 24. Hence, either or both of the signals output from the second and third convolution components 42 and 44 simulates the feedback acoustic transfer function.

As discussed above, the combiner 46 combines a voice electrical signal representing the simulated voice acoustic transfer function and a feedback electrical signal representing the simulated feedback acoustic transfer function into a combined electrical signal in step 108. In this example, the combiner 46 combines the voice electrical signal with the electrical signals output from the second and third convolution components 42 and 44 that make up the feedback electrical signal. The combiner 46 therefore outputs an electrical signal representing the combined signals.

As indicated, the electrical signal output from the combiner 46 is ultimately provided to the microphone electrical input 54 of the vehicle voice interface system 30. However, in this example, the combiner 48 can be further combine the electrical signal with a noise electrical signal representing noise associated with the vehicle 16 to output a combined electrical signal in step 110. The output of the combiner 48 thus acts as an output device to provide the combined electrical signal as the electrical input signal to the microphone electrical input 54 of the vehicle voice interface system 30 in step 112. Also, as with the first, second and third convolution components 40, 42 and 44, the combiner 48 can be included in the computer 52 that is operated to combine a voice electrical signal representing the simulated voice acoustic transfer function and the combined signals into a combined electrical signal. The computer can thus be operated to provide the combined electrical input signal to the microphone electrical input 54 of the vehicle voice interface system 30.

In addition, before the combiner 46 combines the voice electrical signal and the feedback electrical signal, an analog to digital converter as understood in the art can convert the voice electrical signal and the feedback electrical signal from digital electrical signals to an analog electrical simulated voice acoustic transfer function signal and an analog electrical simulated feedback acoustic transfer function signal, respectively. Furthermore, the noise electrical signal representing noise can be an analog electrical noise signal. Accordingly, the combiner 46 can combine the analog electrical noise signal with the analog electrical simulated voice acoustic transfer function signal and the analog electrical simulated feedback acoustic transfer function signal to produce an analog combined electrical signal. The combiner 46 can thus provide the analog combined electrical signal as the electrical input signal to the microphone electrical input 54 of the vehicle voice interface system 30 directly or after the analog combined electrical signal is combined with an analog noise signal by the combiner 48.

Accordingly, the vehicle voice interface system 30 is calibrated to recognize voice commands represented by the voice command data based on the simulated voice acoustic transfer function and the simulated feedback acoustic transfer function in step 114. In particular, the vehicle voice interface system 30 is calibrated based on the combined electrical input signal.

For example, the vehicle voice interface system 30 can include a voice recognition system. Thus, the calibrating can include calibrating the voice recognition system to recognize the voice commands represented by the voice command data based on the simulated voice acoustic transfer function and the simulated feedback acoustic transfer function as combined in the manner discussed above. The vehicle voice interface system 30 also can include a mobile hands-free interface device, such as a Bluetooth device for communication through a mobile device. Thus, the calibrating can include calibrating the mobile hands-free interface device to recognize the voice commands represented by the voice command data based on the simulated voice acoustic transfer function and the simulated feedback acoustic transfer function as combined in the manner discussed above. Furthermore, the calibrating of the vehicle voice interface system 30 can include changing at least one of a volume, a noise cancellation parameter and an echo cancellation parameter of the vehicle voice interface system 30 to calibrate the vehicle voice interface system 30 to recognize the voice commands represented by the voice command data based on the simulated voice acoustic transfer function and the simulated feedback acoustic transfer function as combined in the manner discussed above.

As can be appreciated from the above, the vehicle voice interface system calibration device 10 performs testing and calibration of a vehicle voice interface system 30 in a bench test setup. The process of obtaining and confirming the voice impulse response data and the feedback impulse response data can take about 4 hours. Thus, the amount of time that the head and torso simulator 12 and vehicle 16 is used can be reduced from 40 hours to 4 hours. This results in significant fuel savings since the vehicle 16 need not be operated for 40 hours. Also, the testing facility need not be occupied by the vehicle 16 for 40 hours. Furthermore, the voice impulse response data and the feedback impulse response data can be archived. Therefore, the data for different microphone locations within the vehicle 16 can be easily compared. Moreover, the voice impulse response data and the feedback impulse response data for different types of vehicles and different models years of the same vehicle can be compared without the need for obtaining and testing the actual vehicles except to initially collect the voice impulse response data and the feedback impulse response data. Hence, the voice impulse response data and the feedback impulse response data can be used by suppliers or other entities to test and calibrate the vehicle voice interface system 30.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle voice interface system calibration method comprising:
    electronically convolving voice command data with voice impulse response data representing a voice acoustic signal path between an artificial mouth simulator present in a passenger compartment of a vehicle and a first microphone present in the passenger compartment, to simulate a voice acoustic transfer function pertaining to the passenger compartment of the vehicle;
    electronically convolving audio system output data with feedback impulse response data representing a feedback acoustic signal path between a vehicle audio system output and a second microphone present in the passenger compartment, to simulate a feedback acoustic transfer function pertaining to the passenger compartment of the vehicle;
    combining a voice electrical signal representing the simulated voice acoustic transfer function and a feedback electrical signal representing the simulated feedback acoustic transfer function into a combined electrical signal;
    providing the combined electrical signal to a microphone electrical input of the vehicle voice interface system; and
    calibrating the vehicle voice interface system to recognize voice commands represented by the voice command data based on the combined electrical input signal.

2. The vehicle voice interface system calibration method of claim 1, further comprising
    obtaining a baseline data including the voice impulse response data and the feedback impulse response data by:
        positioning the artificial mouth simulator in the passenger compartment of the vehicle;
        operating the mouth simulator to output a first reference audio signal;
        operating the vehicle audio system output to output a second reference audio signal;
        capturing the voice impulse response data representing the acoustic signal path between the mouth simulator and the first microphone; and
        capturing the feedback impulse response data representing the acoustic signal path between the vehicle audio system output and the second microphone.

3. The method according to claim 2, wherein
the obtaining baseline data further includes positioning an artificial ear simulator in the passenger compartment of the vehicle that includes the second microphone.

4. The method according to claim 2, wherein
the first and second microphones are a microphone input of the vehicle voice interface system;
the capturing of the voice impulse response data obtains the voice impulse response data representing the voice acoustic signal path between the artificial mouth simulator and the microphone input of the vehicle voice interface system; and
the capturing of the feedback impulse response data obtains the feedback impulse response data representing the feedback acoustic signal path between the vehicle audio system output and the microphone input of the vehicle voice interface system.

5. The method according to claim 2, wherein
the vehicle audio system output includes a left speaker and a right speaker; and
the obtaining of the feedback impulse response data includes obtaining first feedback impulse response data representing a feedback acoustic signal path between the left speaker and the second microphone and obtaining second feedback impulse response data representing a feedback acoustic signal path between the right speaker and the second microphone, the feedback impulse response data including the first and second feedback impulse response data.

6. The method according to claim 1, wherein
the combining further comprises combining the voice electrical signal, the feedback electrical signal and a noise electrical signal representing noise associated with the vehicle into the combined electrical signal that is provided to the microphone electrical input of the vehicle voice interface system and used during the calibrating to calibrate the vehicle voice interface system.

7. The method according to claim 6, further comprising
converting the voice electrical signal representing the simulated voice acoustic transfer function and the feedback electrical signal representing the simulated feedback acoustic transfer function from digital electrical signals to an analog electrical simulated voice acoustic transfer function signal and an analog electrical simulated feedback acoustic transfer function signal, respectively; and
wherein
the noise electrical signal representing noise is an analog electrical noise signal; and
the combining includes combining the analog electrical noise signal with the analog electrical simulated voice acoustic transfer function signal and the analog electrical simulated feedback acoustic transfer function signal to provide an analog combined electrical signal to the microphone electrical input of the vehicle voice interface system.

8. The method according to claim 1, further comprising
operating a computer to perform the electronically convolving of the voice command data with the voice impulse response data and the electronically convolving of audio system output data with the feedback impulse response data;
operating the computer to perform the combining of the voice electrical signal and the feedback electrical signal into the combined electrical signal; and
operating the computer to perform the providing of the combined electrical input signal to the microphone electrical input of the vehicle voice interface system.

9. The method according to claim 8, further comprising
operating a noise mixing device outside of the computer to combine the combined electrical signal and a noise electrical signal representing noise associated with the vehicle into a second combined electrical signal; and
wherein the calibrating includes calibrating the vehicle voice interface system based on the second combined electrical signal.

10. The method according to claim 1, wherein
the vehicle voice interface system includes a voice recognition system; and
the calibrating includes calibrating the voice recognition system to recognize the voice commands represented by the voice command data based on the simulated voice acoustic transfer function and the simulated feedback acoustic transfer function.

11. The method according to claim 1, wherein
the vehicle voice interface system includes a mobile hands-free interface device; and
the calibrating includes calibrating the mobile hands-free interface device to recognize the voice commands represented by the voice command data based on the simulated voice acoustic transfer function and the simulated feedback acoustic transfer function.

12. The method according to claim 1, wherein
the calibrating of the vehicle voice interface system includes changing at least one of a volume, a noise cancellation parameter and an echo cancellation parameter of the vehicle voice interface system to calibrate the vehicle voice interface system to recognize the voice commands represented by the voice command data based on the simulated voice acoustic transfer function and the simulated feedback acoustic transfer function.

13. A vehicle voice interface system calibration method comprising:
obtaining a baseline data including a voice impulse response data and a feedback impulse response by:
positioning an artificial mouth simulator in a passenger compartment of a vehicle;
operating the mouth simulator to output a first reference audio signal;
operating a vehicle audio system output to output a second reference audio signal;
capturing the voice impulse response data representing the acoustic signal path between the mouth simulator and a first microphone; and
capturing the feedback impulse response data representing the acoustic signal path between the vehicle audio system output and a second microphone;
electronically convolving voice command data with the voice impulse response data to simulate a voice acoustic transfer function pertaining to the passenger compartment of the vehicle;
electronically convolving audio system output data with feedback impulse response data to simulate a feedback acoustic transfer function pertaining to the passenger compartment of the vehicle;
combining a voice electrical signal representing the simulated voice acoustic transfer function, a feedback electrical signal representing the simulated feedback acoustic transfer function and a noise electrical signal representing noise associated with the vehicle into a combined electrical signal;
providing the combined electrical signal to the microphone electrical input of the vehicle voice interface system; and
calibrating the vehicle voice interface system to recognize voice commands represented by the voice command data based on the combined electrical signal.

14. A vehicle voice interface system calibration device comprising:
a first convolution component configured to electronically convolve voice command data with voice impulse response data representing a voice acoustic signal path between an artificial mouth simulator present in a passenger compartment of a vehicle and a first microphone present in the passenger compartment, to simulate a voice acoustic transfer function pertaining to the passenger compartment of the vehicle;
a second convolution component configured to electronically convolve audio system output data with feedback impulse response data representing a feedback acoustic signal path between a vehicle audio system output and a second microphone present in the passenger compartment, to simulate a feedback acoustic transfer function pertaining to the passenger compartment of the vehicle;
a combiner configured to combine a voice electrical signal representing the simulated voice acoustic transfer function and a feedback electrical signal representing the simulated feedback acoustic transfer function into a combined electrical signal, and to provide the combined electrical signal to a microphone electrical input of the vehicle voice interface system; and
a calibration component configured to calibrate the vehicle voice interface system to recognize voice commands represented by the voice command data based on the combined electrical input signal.

15. The vehicle voice interface system calibration device according to claim 14, wherein
the combiner is further configured to combine the voice electrical signal, the feedback electrical signal and a noise electrical signal representing noise associated with the vehicle into the combined electrical signal that is provided to the microphone electrical input of the vehicle voice interface system.

* * * * *